(12) United States Patent
Seth et al.

(10) Patent No.: US 8,349,771 B2
(45) Date of Patent: Jan. 8, 2013

(54) METHOD FOR IMPROVING THE CLEAN-UP OF EMULSIFIED ACID FLUID SYSTEMS

(75) Inventors: Kushal Seth, Houston, TX (US); Allen D. Gabrysch, Houston, TX (US); Brian A. Evans, The Woodlands, TX (US); James B. Crews, Willis, TX (US)

(73) Assignee: Baker Hughes Incorporated, Houston, TX (US)

( * ) Notice: Subject to any disclaimer, the term of this patent is extended or adjusted under 35 U.S.C. 154(b) by 338 days.

(21) Appl. No.: 12/815,041

(22) Filed: Jun. 14, 2010

(65) Prior Publication Data
US 2011/0303414 A1 Dec. 15, 2011

(51) Int. Cl.
*C09K 8/68* (2006.01)
(52) U.S. Cl. .......... 507/200; 507/203; 166/305.1; 516/53
(58) Field of Classification Search .......... 507/200, 507/203; 516/53; 166/305.1
See application file for complete search history.

(56) References Cited

U.S. PATENT DOCUMENTS

| | | |
|---|---|---|
| 2,038,720 A | 4/1936 | DeGroote |
| 2,890,169 A | 6/1959 | Prokop |
| 3,509,951 A | 5/1970 | Enochs |
| 3,681,240 A | 8/1972 | Fast et al. |
| 3,899,431 A | 8/1975 | Hayes et al. |
| 3,977,472 A | 8/1976 | Graham et al. |
| 4,002,204 A | 1/1977 | Cavin |
| 4,012,329 A | 3/1977 | Hayes et al. |
| 4,036,300 A | 7/1977 | Holm et al. |
| 4,233,165 A | 11/1980 | Salathiel et al. |
| 4,352,396 A | 10/1982 | Friedman |
| 4,360,061 A | 11/1982 | Canter et al. |
| 4,518,511 A | 5/1985 | Kaufman et al. |
| 4,542,791 A | 9/1985 | Drake et al. |
| 4,687,590 A | 8/1987 | Haack |
| 4,964,468 A | 10/1990 | Adams et al. |
| 5,008,026 A | 4/1991 | Gardner et al. |
| 5,094,296 A | 3/1992 | DaGue |
| 5,189,012 A | 2/1993 | Patel et al. |
| 5,476,144 A | 12/1995 | Nahm et al. |
| 5,902,227 A | 5/1999 | Rivas |
| 5,942,216 A | 8/1999 | Herb et al. |
| 5,985,177 A | 11/1999 | Yoshida et al. |
| 6,414,139 B1 | 7/2002 | Unger et al. |
| 6,581,687 B2 | 6/2003 | Collins et al. |
| 6,613,720 B1 | 9/2003 | Feraud et al. |
| 6,793,025 B2 | 9/2004 | Patel et al. |
| 6,805,198 B2 | 10/2004 | Huang et al. |
| 6,849,581 B1 | 2/2005 | Thompson et al. |
| 7,615,516 B2 | 11/2009 | Yang et al. |
| 2003/0166472 A1 | 9/2003 | Pursley et al. |
| 2004/0014821 A1 | 1/2004 | Varadaraj |
| 2008/0179062 A1 | 7/2008 | Watkins et al. |

FOREIGN PATENT DOCUMENTS

| | | |
|---|---|---|
| GB | 2022653 A | 12/1979 |
| GB | 2325478 A | 11/1998 |
| JP | 2001025359 A | 1/2001 |
| WO | 8100850 A1 | 4/1981 |
| WO | 0183942 A1 | 11/2001 |

OTHER PUBLICATIONS

S. Matsumoto, "Interactions Between the Dispersed Globules of W/O/W Emulsions in Existence of Proteins and Saccharides," 10th Int'l. Symposium on Surfactants in Solution, Caracas, Venezuela, Jun. 30, 1994, pp. 295-296.
C. Py, et al., "Investigations of Water/Oil/Water Multiple Emulsions for Cosmetic Applications," 10th Int'l. Symposium on Surfactants in Solution, Caracas, Venezuela, Jun. 30, 1994, p. 297.
A. Cardenas, et al., "An Experimental Method to Collect Data on the Controlled Release Capacity of a Multiple Emulsion," 10th Int'l. Symposium on Surfactants in Solution, Caracas, Venezuela, Jun. 30, 1994, p. 299.
M. Brinceno, et al., "Water Diffusion Induced by Osmotic Pressure Gradients in Multiple W/O/W Bitumen-in-Water Emulsions," 10th Int'l. Symposium on Surfactants in Solution, Caracas, Venezuela, Jun. 30, 1994, p. 301.
N. Garti, et al., "Double Emulsions: Progress and Applications," Current Opinion in Colloid & Interface Science, vol. 3, No. 6, Dec. 1996, pp. 657-667.
T. N. C. Dantas, et al., "Microemulsion System as a Steel Corrosion Inhibitor," Corrosion, Sep. 2002, pp. 723-727, vol. 58, No. 9, NACE International.
J. Paktinat, et al., "Microemulsion Reduces Adsorption and Emulsion Tendencies in Bradford and Speechley Sandstone Formations," SPE 93270, 2005 SPE Int'l Symposium on Oilfield Chem., Feb. 2-4, 2005, Houston, Texas.
G. Penny, et al., "The Application of Microemulsion Additive in Drilling and Stimulation Results in Enhanced Gas Production," SPE 94274, 2005 SPE Production and Operations Symposium, Apr. 17-19, 2005, Oklahoma City, Oklahoma.

*Primary Examiner* — Alicia Toscano
(74) *Attorney, Agent, or Firm* — Mossman Kumar & Tyler PC

(57) ABSTRACT

Using a complex emulsion for treating a subterranean formation, such as to dissolve minerals therein (e.g. carbonates, scales, and/or filter cake) to improve permeability, substantially improves post treatment fluid clean-up for improved hydrocarbon production. The complex emulsion is made by mixing an acid aqueous phase with an oil external microemulsion to give an initial product, where the acid aqueous phase is an external phase and the microemulsion is an internal phase. Then the initial product is mixed with a second oil (e.g. xylene, diesel, toluene, kerosene, other aromatics, refined hydrocarbons and the like) containing an emulsifier to make a complex emulsion.

21 Claims, No Drawings

METHOD FOR IMPROVING THE CLEAN-UP OF EMULSIFIED ACID FLUID SYSTEMS

TECHNICAL FIELD

The present invention relates to acidizing treatment fluids used during hydrocarbon recovery operations, and more particularly relates, in one embodiment, to methods and compositions of cleaning up from emulsified acidized fluid systems after a subterranean formation is treated therewith.

BACKGROUND

Hydrocarbons sometimes exist in a formation but cannot flow readily into the well because the formation has very low permeability. Acidizing wells is a conventional process for increasing or restoring the permeability of subterranean formations so as to facilitate the flow of oil and gas from the formation into the well. This process involves treating the formation with an acid to dissolve fines and carbonate scale plugging or clogging the pores, thereby opening the pores and other flow channels and increasing the permeability of the formation. Continued pumping forces the acid into the formation, where it etches channels or worm-holes. These channels provide ways for the formation hydrocarbons to enter the well bore.

Conventional acidizing fluids, such as hydrochloric acid or a mixture of hydrofluoric and hydrochloric acids, have high acid strength and quick reaction with fines and scale nearest the well bore, and have a tendency to corrode tubing, casing and down hole equipment, such as gravel pack screens and down hole pumps, especially at elevated temperatures. In addition, above 200° F. (92° C.), HCl is not recommended in some cases because of its destructive effect on the rock matrix. Due to the type of metallurgy, long acid contact times and high acid sensitivity of the formations, removal of the scale with hydrochloric acid and hydrochloric acid mixtures has been largely unsuccessful. However, there are other acid fluid system to dissolve carbonate and/or scale and remove the source of the fines through acidizing the surrounding formation while not damaging the down hole equipment, particularly for high temperature wells. These acid systems include, but are not necessarily limited to mixtures of tricarboxylic acids, aminocarboxylic acids, dicarboxylic acids including, but not necessarily limited to, oxalic acid (ethanedioic acid), malonic acid (propanedioic acid), succinic acid (butanedioic acid), glutaric acid (pentanedioic acid), adipic acid (hexanedioic acid), pimelic acid (heptanedioic acid), and mixtures thereof. Further details about these acids may be had with reference to U.S. Pat. No. 6,805,198 assigned to Baker Hughes Incorporated, and it is incorporated herein by reference.

Other acids used to treat subterranean formations include, but are not necessarily limited to sulfuric acid, phosphoric acid, hydrofluoric acid, hydrobromic acid, fluoroboric acid, formic acid, acetic acid, glycolic acid, and mixtures of these and the forementioned acids.

It is also known to use emulsified fluids containing such acids to treat subterranean formations. Emulsified acids give reduced or retarded acid reaction rates because of the oil-external outer phase. Some of these acids mentioned above have reduced acid reaction rates with carbonate reservoirs that in turn allows deeper and narrower wormholes to form that may include secondary microfractures. The longer wormholes and secondary microfractures need superior clean-up ability in order to improve hydrocarbon production rates.

It would be desirable if a composition and method could be devised to overcome some of the problems in the conventional acidizing methods and fluids, particularly with respect to cleaning up emulsified acid fluids after treatment is complete.

SUMMARY

There is thus provided in one non-limiting embodiment a complex emulsion which includes from about 10 to about 90 vol %, based on total volume, of an oil external phase, from about 90 to about 10 vol %, based on the total volume, of an internal aqueous acid phase that, in turn, contains a microemulsion, and from about 0.1 to about 40 vol %, based on total volume, of an emulsifier in the hydrocarbon phase.

There is also provided in another non-restrictive form a method for making a complex emulsion that involves mixing an acid aqueous phase with an oil external microemulsion to give an initial product, where the acid aqueous phase is an external phase and the microemulsion is an internal phase. The method subsequently includes mixing the initial product with a second oil containing an emulsifier to make the complex emulsion. Alternatively, complex emulsions so made may be provided.

Further there is provided in another non-limiting embodiment a method of treating a subterranean formation that includes injecting a complex emulsion into a subterranean formation. The complex emulsion may be made by a method for making a complex emulsion which includes first mixing an acid aqueous phase with an oil external microemulsion to give an initial product, where the acid aqueous phase is an external phase and the microemulsion is an internal phase. Subsequently, the initial product is mixed with a second oil containing an emulsifier to make a complex emulsion. Then, the treating method includes dissolving at least a portion of the formation with the acid. Finally, the method may involve removing at least a portion of the complex emulsion from the subterranean formation. The amount of complex emulsion removed is greater than would be removed using an identical complex emulsion except that although acid was included, the acid was not included in an aqueous acid phase that is internal to the second oil, but which aqueous acid phase contains the microemulsion, but was otherwise included.

DETAILED DESCRIPTION

A method for improving the clean-up of emulsified acid fluid systems has been discovered. These systems generally have a primary emulsifier and often an optional secondary emulsifier to achieve a thermally stable emulsion with an oil external phase and an acid internal phase. Typically, the acid internal phase may also comprise water. As noted, emulsified acids give reduced or retarded acid reaction rates because of the oil-external outer phase. In prior emulsified acid formulations, it has been unsuccessful to include additional surfactants to aid in the fluid clean-up because these surfactants most typically decrease the stability of the emulsified acid fluid (that is, at elevated temperatures the phases separate) and its delayed-acid reaction rates. It has been surprisingly found that the proposed emulsified acid formulations incorporate unique and compatible microemulsion technology within the acid-internal phase resulting in a more complete treatment fluid clean-up that has little to no adverse effects on fluid stability, even at elevated temperatures of about 200° F. (about 93° C.). That is, a complex emulsion is described where a microemulsion is internal to an aqueous acid phase, often referred to as an initial product herein, which initial product is, in turn, within an oil external phase. In other words, the acid is present within the aqueous phase which is an external phase to the microemulsion; however the aqueous phase containing the acid is internal to an oil external phase (sometimes called a second oil herein) which may suitably be xylene, diesel, toluene, kerosene, other aromatics, refined hydrocarbons and mixtures thereof.

Similar to other emulsified acid systems, the present fluids have reduced acid reaction rates with carbonate reservoirs that in turn permit deep and narrow wormholes to form that may include secondary microfractures. The longer wormholes and secondary microfractures require superior clean-up in order to improve hydrocarbon production rates. Unique to these methods and compositions, the microemulsion cleaning agents go wherever the acid goes, and as the acid spends on the rock, the cleaning agents of the microemulsion in the acid-internal phase are released and significantly improve the recovery of the treatment fluid. That is, a method of clean-up that involves separately injecting another fluid, such as a surfactant, suffers from the difficulty of subsequently getting the surfactant into the wormholes and microfractures. In the present method and composition, the microemulsion travels with the emulsified acid. Additionally, these emulsions may be used to clean up various types of filter cake and improve the wettability of the rock.

In preparing the final complex emulsion (FCE), a first step is to mix or combine an acid with an oil-external microemulsion. This addition of acid to microemulsion gives an initial product, where the acid is present in an internal phase of the total emulsion system (FCE) after the initial product is combined with an oil phase such as xylene or diesel. As an additive, the microemulsion ranges from about 0.1 to about 20 volume % of the total of the initial product, in one non-limiting embodiment. In other words, a microemulsion product, which is generally or mostly an oil external emulsion, is mixed in with an aqueous acid. Then this mixture, sometimes called an initial product, is emulsified in a hydrocarbon phase (sometimes called a second oil) such as diesel or xylene to give a complex emulsion or final complex emulsion (FCE).

Stated another way, using exemplary proportions which are not necessarily limiting, an oil external microemulsion (ME) is added to an acid aqueous phase. The ME portions may range from about 0.1 to about 40 vol % and the acid phase (water external) containing the ME product comprises from about 5 to about 90 vol %. This initial product is then emulsified in a hydrocarbon phase (e.g. xylene or diesel) to give an oil external FCE where the hydrocarbon phase ranges from about 10 to about 90 vol % of the total volume, the water phase internal to the oil external phase ranges from about 90 to about 10 vol % of the total volume, where it is understood that the water phase contains within it as internal to it a microemulsion. Emulsifiers are initially present in the hydrocarbon phase (e.g. xylene or diesel) and the emulsifiers are present in the range of from about 0.1 to about 40 vol %, again, based on the total volume of the FCE.

The microemulsion may be an industry accepted or commercially available product like CST ME 68433 available from Conlen Surfactant Technology or MA 844A from CESI Chemicals. As noted, 0.1 to about 40 vol % may go into the acid phase.

The oil phase of the microemulsion and the second oil (added to the initial product to give the final complex emulsion) may be the same or different; suitable hydrocarbons include, but are not necessarily limited to, xylene, toluene, diesel, kerosene and other aromatics and refined hydrocarbons and mixtures thereof. Other suitable refined hydrocarbon and other aromatic hydrocarbons may include, but are not necessarily limited to, organic fluids such as aliphatic, alicyclic and aromatic hydrocarbons, esters, derivatives of these compounds, as well as mixtures thereof. Specific examples of suitable aliphatic hydrocarbons include, but are not necessarily limited to, alkanes such as n-octane, n-decane, n-tridecane, and higher carbon number alkanes. Other suitable aliphatic hydrocarbons include alkenes and alkadienes. Alicyclic compounds include cyclohexane, and the like. Specific examples of suitable aromatics include, but are not necessarily limited to, benzene, toluene, xylene, ethylbenzene and other alkyl benzenes, naphthalene, and the like. Other examples include nonylphenols, ethoxylated nonylphenol, and the like. Particular examples of commercial aromatic products include, but are not necessarily limited to, FRACSOL, FRACSOL-S, XYSOL from Trysol of Calgary, Canada or GeoStim of the United States.

Other specific examples of suitable organic fluids include, but are not necessarily limited to, at least one of diesel, gasoline, kerosene, reformate, naphthalene, xylene, toluene, mineral oil, light mineral oil, condensate, crude oil, lubricating oils, or mixtures thereof (such as diesel mixed with condensate to lower API gravity, etc.).

Also suitable are synthetic oils (including, but not necessarily limited to, synthetic hydrocarbon-based oils, ester-type oils, and the like.). Also suitable are more environmentally compatible (e.g., biodegradable) natural or synthetic organic fluids such as ExxonMobil's ESCAID 90 or ESCAID 110, or refined kerosene (such as LOTOX available from Exxon), ALPHA OLEFIN (from Baker Performance Chemical), HYDROSOLVE P150 or HYDROSOLVE B100 (from Shrieve Chemical Products), ISOPAR L or ISOPAR M (from Nalco-Exxon Chemical Company), and the like. Natural organic based fluids such as animal oils and vegetable oils may also be suitable including, but not necessarily limited to, linseed oil, palm oil, cotton seed oil, rapeseed oil, soybean oil, olive oil, canola oil, sunflower oil, peanut oil, and the like. Other aromatic and refined hydrocarbons are described in U.S. Pat. No. 6,849,581, incorporated by reference herein in its entirety.

Suitable acids for use herein include, but are not necessarily limited to, hydrochloric acid, sulfuric acid, phosphoric acid, hydrofluoric acid, hydrobromic acid, fluoroboric acid, formic acid, acetic acid, glycolic acid, dicarboxylic acid, tricarboxylic acids, aminocarboxylic acids and mixtures thereof.

Suitable emulsifiers include, but are not necessarily limited to, low HLB surfactants or oil soluble surfactants. In one non-limiting embodiment the HLB is about 12 or below; alternatively, the HLB is about 10 or below; and in another non-limiting embodiment is about 8 or below. More specific suitable emulsifiers include, but are not necessarily limited to, polysorbates, fatty acids, ethoxylated fatty acids, propoxylated fatty acids, fatty acid salts, tall oils, castor oils, triglycerides, glucosides, and mixtures and derivatized fatty acids such as those disclosed in U.S. Pat. No. 6,849,581, incorporated by reference herein in its entirety. Suitable polysorbates include, but are not necessarily limited to, sorbitan monolaurate, sorbitan monopalmitate, sorbitan monostearate, sorbitan monooleate, sorbitan monodecanoate, sorbitan monooctadecanoate, sorbitan trioleate and the like and ethoxylated derivatives thereof. For instance, these emulsifiers may have up to 20 ethoxy groups thereon. Suitable polysorbates include, but are not necessarily limited to, SPAN® 40, SPAN 40, SPAN 60 and SPAN 80 polysorbates available from Croda International PLC. Other suitable emulsifiers include stearyl alcohol, lecithin, fatty acid amine carboxylates and mixtures thereof. In one non-limiting embodiment, more than one emulsifier is used. Matching which emulsifiers work well together to give the desired results may largely be a matter of trial and error.

The emulsified acid fluids or FCEs may effectively generate wormholes to stimulate production in subterranean carbonate formations and dissolve carbonate and/or scale, and these emulsified acid systems may effectively remove fines to recover production in sandstone formations at elevated temperatures. In one non-limiting aspect, the microemulsions within the acid emulsion systems can help clean up the emulsified systems once the acid has done its job generating wormholes, e.g.

It will be appreciated that it is difficult to specify with precision the amount of emulsified acid system or FCE that must be used to effectively acidize a particular subterranean formation. A number of complex, interrelated factors must be taken into account that would affect such a proportion, including but not necessarily limited to, the temperature of the formation, the pressure of the formation, the particular fines and scales present in the formation (e.g. calcium carbonate, silicates, and the like), the particular dicarboxylic acid(s) used, the particular kind of rock in the formation, the expected contact time of the acid composition with the formation, etc.

For stimulation treatments, contact times are determined from the maximum pumping rate that does not cause the downhole pressure to exceed the fracturing pressure. This type of treatment is called a "matrix" acid job.

For scale/fines removal procedures, contact times are based on laboratory tests, but usually range from about 0.5 hour to about 2 hour with the most common time being about 0.5 hour.

It is expected that the complex emulsions as described herein will substantially improve post fluid clean-up for improved hydrocarbon production. That is, a greater amount of the complex emulsion may be removed after treatment is accomplished as compared with using an identical complex emulsion, except that the acid was not included in an oil external microemulsion. While it is certainly desirable that all of the complex emulsion be removed from the formation, it will be appreciated that the method described herein may be considered successful if less than all of the complex emulsion is removed and cleaned up.

The invention will be further illustrated with respect to certain experiments, but these examples are not intended to limit the invention, but only to further describe it in certain specific, non-limiting embodiments.

In the foregoing specification, the invention has been described with reference to specific embodiments thereof, and has been demonstrated as effective in providing emulsified acid systems that have improved clean-up and removal. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of acids, hydrocarbon phases, emulsifiers and other components falling within the claimed parameters, but not specifically identified or tried in a particular composition or under specific conditions, are anticipated to be within the scope of this invention.

The present invention may suitably comprise, consist or consist essentially of the elements disclosed and may be practiced in the absence of an element not disclosed. For example the complex emulsion may consist essentially of or consist of an oil external phase, an internal aqueous phase with a microemulsion and an emulsifier, where such terms are defined by the claims. Alternatively, the method of making the complex emulsion may consist essentially of or consist of mixing an acid aqueous phase with an oil external microemulsion to give an initial product and then mixing the initial product with a second oil containing an emulsifier to make a complex emulsion, where such terms are defined by the claims.

The words "comprising" and "comprises" as used throughout the claims is to interpreted "including but not limited to".

What is claimed is:

1. A complex emulsion comprising:
   from about 10 to about 90 vol%, based on total volume, of an oil external phase,
   from about 90 to about 10 vol%, based on the total volume, of an internal aqueous acid phase containing a microemulsion, and
   from about 0.1 to about 40 vol%, based on total volume, of an emulsifier in the hydrocarbon phase.

2. The complex emulsion of claim 1 where the oil external phase is selected from the group consisting of xylene, diesel, toluene, kerosene, other aromatics, refined hydrocarbons and mixtures thereof.

3. The complex emulsion of claim 1 where the acid in the aqueous acid phase is selected from the group of acids consisting of hydrochloric acid, sulfuric acid, phosphoric acid, hydrofluoric acid, hydrobromic acid, fluoroboric acid, formic acid, acetic acid, glycolic acid, dicarboxylic acid, tricarboxylic acids, aminocarboxylic acids and mixtures thereof.

4. The complex emulsion of claim 1 where the emulsifier is has an HLB of about 12 or below.

5. The complex emulsion of claim 1 where the emulsifier is selected from the group consisting of polysorbates, fatty acid amine carboxylates, stearyl alcohol, lecithin, fatty acids, ethoxylated fatty acids, propoxylated fatty acids, fatty acid salts, tall oils, castor oils, triglycerides, glucosides, and mixtures thereof.

6. A complex emulsion comprising:
   from about 10 to about 90 vol%, based on total volume, of an oil external phase selected from the group consisting of xylene, diesel, toluene, kerosene, other aromatics, refined hydrocarbons and mixtures there of,
   from about 90 to about 10 vol%, based on the total volume, of an internal aqueous acid phase containing a microemulsion internal to the aqueous acid phase, where the acid is selected from the group of acids consisting of hydrochloric acid, sulfuric acid, phosphoric acid, hydrofluoric acid, hydrobromic acid, fluoroboric acid, formic acid, acetic acid, glycolic acid, dicarboxylic acid, tricarboxylic acids, aminocarboxylic acids and mixtures thereof, and
   from about 0.1 to about 40 vol%, based on total volume, an emulsifier in the hydrocarbon phase, where the emulsifier is selected from the group consisting of polysorbates, carboxylate amines, fatty acids, ethoxylated fatty acids, propoxylated fatty acids, fatty acid salts, tall oils, castor oils, triglycerides, glucosides and mixtures thereof.

7. A method for making a complex emulsion comprising:
   mixing an acid aqueous phase with an oil external microemulsion to give an initial product, where the acid aqueous phase is an external phase and the microemulsion is an internal phase; and
   mixing the initial product with a second oil containing an emulsifier to make the complex emulsion.

8. The method of claim 7 where the complex emulsion comprises:
from about 10 to about 90 vol%, based on total volume, of an oil external phase, the oil external phase originating from the second oil,
from about 90 to about 10 vol%, based on the total volume, of an aqueous acid phase containing a microemulsion, and
from about 0.1 to about 40 vol%, based on total volume, of an emulsifier in the hydrocarbon phase.

9. The method of claim 8 where the oil from the oil external microemulsion and the second oil are selected from the group consisting of the same oils and different oils.

10. The method of claim 7 where the oil in the oil external microemulsion and the second oil are selected from the group consisting of xylene, diesel, toluene, kerosene, other aromatics, refined hydrocarbons and mixtures thereof.

11. The method of claim 7 where the acid is selected from the group of acids consisting of hydrochloric acid, sulfuric acid, phosphoric acid, hydrofluoric acid, hydrobromic acid, fluoroboric acid, formic acid, acetic acid, glycolic acid, dicarboxylic acid, tricarboxylic acids, aminocarboxylic acids and mixtures thereof.

12. The method of claim 7 where the emulsifier is has an HLB of about 12 or below.

13. The method of claim 7 where the emulsifier is selected from the group consisting of polysorbates, fatty acid amine carboxylates, stearyl alcohol, lecithin, fatty acids, ethoxylated fatty acids, propoxylated fatty acids, fatty acid salts, tall oils, castor oils, triglycerides, glucosides and mixtures thereof.

14. A complex emulsion made by the method of claim 7.

15. A method of treating a subterranean formation comprising:
injecting a complex emulsion into a subterranean formation, where the complex emulsion has been made by a method for making a complex emulsion comprising:
mixing an acid aqueous phase with an oil external microemulsion to give an initial product, where the acid aqueous phase is an external phase and the microemulsion is an internal phase; and
mixing the initial product with a second oil containing an emulsifier to make the complex emulsion;
and wherein the complex emulsion comprises: from about 10 to about 90 vol%, based on total volume, of an oil external phase, the oil external phase originating from the second oil, from about 90 to about 10 vol%, based on the total volume, of an internal aqueous acid phase containing a microemulsion, and from about 0.1 to about 40 vol%, based on total volume, of an emulsifier in the hydrocarbon phase;
dissolving at least a portion of the formation with the acid.

16. The method of claim 15 where in the complex emulsion, the oil from the oil external microemulsion and the second oil are selected from the group consisting of the same oils and different oils.

17. The method of claim 15 where in the complex emulsion, the oil in the oil external microemulsion and the second oil are selected from the group consisting of xylene, diesel, toluene, kerosene, other aromatics, refined hydrocarbons and mixtures thereof.

18. The method of claim 15 where the acid is selected from the group of acids consisting of hydrochloric acid, sulfuric acid, phosphoric acid, hydrofluoric acid, hydrobromic acid, fluoroboric acid, formic acid, acetic acid, glycolic acid, dicarboxylic acid, tricarboxylic acids, aminocarboxylic acids and mixtures thereof.

19. The method of claim 15 where the emulsifier is has an HLB of about 12 or below.

20. The method of claim 15 where the emulsifier is selected from the group consisting of polysorbates, fatty acid amine carboxylates, stearyl alcohol, lecithin, fatty acids, ethoxylated fatty acids, propoxylated fatty acids, fatty acid salts, tall oils, castor oils, triglycerides, glucosides and mixtures thereof.

21. The method of claim 15 further comprising removing at least a portion of the complex emulsion from the subterranean formation where the amount of complex emulsion removed is greater than would be removed using an identical complex emulsion except that the acid was not included in an oil external microemulsion.

* * * * *